United States Patent
Bang et al.

(10) Patent No.: US 9,647,450 B2
(45) Date of Patent: May 9, 2017

(54) FAULT CURRENT LIMITER

(71) Applicant: LSIS CO., LTD., Anyang-si, Gyeonggi-do (KR)

(72) Inventors: Seung Hyun Bang, Sejong (KR); Won Joon Choe, Cheongju-si (KR); Min Jee Kim, Daejeon (KR); Kil Young Ahn, Daejeon (KR)

(73) Assignee: LSIS CO., LTD., Anyang-si (KR)

( * ) Notice: Subject to any disclaimer, the term of this patent is extended or adjusted under 35 U.S.C. 154(b) by 0 days.

(21) Appl. No.: 14/708,076

(22) Filed: May 8, 2015

(65) Prior Publication Data

US 2015/0333506 A1 Nov. 19, 2015

(30) Foreign Application Priority Data

May 13, 2014 (KR) .......................... 10-2014-0057438

(51) Int. Cl.
*H02H 9/02* (2006.01)
*H02H 7/00* (2006.01)

(52) U.S. Cl.
CPC ............ *H02H 9/023* (2013.01); *H02H 7/001* (2013.01); *H02H 7/008* (2013.01); *H02H 9/026* (2013.01); *Y02E 40/69* (2013.01)

(58) Field of Classification Search
CPC .................. H02H 9/023; H02H 7/001; H02H 9/02–9/028
See application file for complete search history.

(56) References Cited

U.S. PATENT DOCUMENTS

2008/0043382 A1\* 2/2008 Lee .................. H02H 7/001
361/19
2009/0195954 A1\* 8/2009 Sim .................. H02H 9/02
361/93.9

(Continued)

FOREIGN PATENT DOCUMENTS

EP 0926797 6/1999
JP 04-301776 10/1992

(Continued)

OTHER PUBLICATIONS

Korean Intellectual Property Office Application Serial No. 10-2014-0057438, Office Action dated Oct. 13, 2015, 5 pages.

(Continued)

*Primary Examiner* — Stephen W Jackson
*Assistant Examiner* — Christopher Clark
(74) *Attorney, Agent, or Firm* — Lee, Hong, Degerman, Kang & Waimey PC

(57) ABSTRACT

This specification relates to fault current limiter (FCL). More particularly, to solve problems of protecting and designing current limiting impedance in a protective coordination system, as limitations of the related art, the fault current limiter may measure heat capacity of a current limiting impedance unit by detecting fault current flowing to the current limiting impedance unit and limiting the fault current flowing to the current limiting impedance unit according to the measured heat capacity, which may result in preventing the current limiting impedance unit from being damaged due to the fault current, preventing an extended accident due to the damaged current limiting impedance unit and enabling a stabilized system and line protection.

9 Claims, 4 Drawing Sheets

(56) References Cited

U.S. PATENT DOCUMENTS

2012/0316069 A1* 12/2012 Murphy ................ H02H 7/001
                                                    505/150
2016/0020604 A1*  1/2016 Isojima ................ H02H 9/023
                                                    361/93.9

FOREIGN PATENT DOCUMENTS

JP     2000-209772      7/2000
KR    10-2012-0020988   3/2012

OTHER PUBLICATIONS

European Patent Office Application Serial No. 15166765.6, Search Report dated Sep. 28, 2015, 7 pages.

* cited by examiner

| EXCEEDED DEGREE [KWh] | OPERATING TIME REDUCTION [s] |
|---|---|
| MORE THAN 1 AND SMALLER THAN 20 | 0.01 |
| 20 ~ 30 | 0.02 |
| 30 ~ 40 | 0.03 |
| 40 ~ 50 | 0.04 |
| 50 ~ 60 | 0.05 |
| ⋮ | ⋮ |

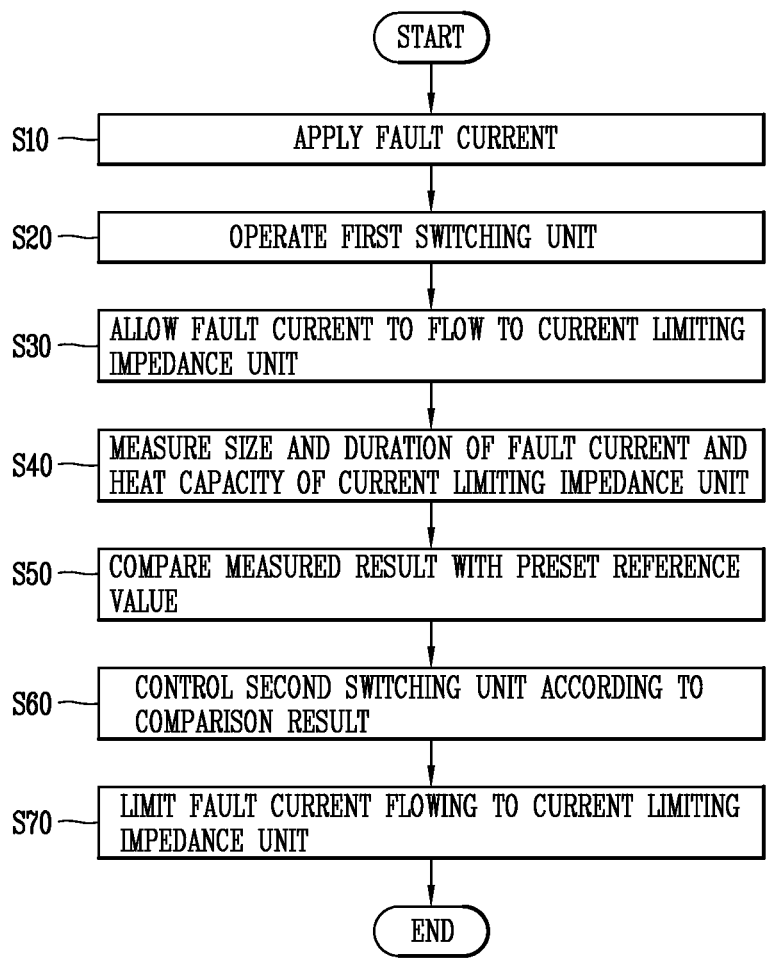

FAULT CURRENT LIMITER

CROSS-REFERENCE TO RELATED APPLICATIONS

Pursuant to 35 U.S.C. §119(a), this application claims the benefit of earlier filing date and right of priority to Korean Application No. 10-2014-0057438, filed on May 13, 2014, the contents of which are all incorporated by reference herein in their entirety.

BACKGROUND OF THE DISCLOSURE

1. Field of the Disclosure

This specification relates to fault current limiter, and more particularly, fault current limiter, capable of preventing damage of fault current impedance unit due to fault current, by detecting the fault current flowing to the current limiting impedance unit and accordingly switching a flow path of the fault current.

2. Background of the Disclosure

In general, fault current limiters (FCLs) do not have blocking capabilities by themselves. Thus, the FCL allows the flow of limited fault current until a circuit breaker installed in a system blocks the fault current. In typical protective coordination, as illustrated in FIG. 1, for a fault F2, fault current should be blocked by a second circuit breaker CB2. When the CB2 malfunctions due to having a trouble, a first circuit breaker CB1 operates as backup protection. And, for a fault F1, fault current is blocked by the CB1. Hence, heat capacity of the conventional FCL impedance has been designed and manufactured even by taking into account a blocking time taken by the backup protection of the CB1 due to the malfunctioned CB2. In the system illustrated in FIG. 1, the backup protection of the CB1 is carried out due to the malfunctioned CB2, and thus a normal protective coordination system should operate. However, when even the CB1 to operate as the backup protection fails to block the fault current due to its malfunction, a current over a reference value flows to the impedance of the FCL which has been designed based on the conventional normal protective coordination system. Therefore, the heat capacity of the impedance of the FCL increases over a designed value. This may be likely to cause damage to the FCL and a problem even in the system.

SUMMARY OF THE DISCLOSURE

Therefore, an aspect of the detailed description is to provide fault current limiter, capable of overcoming problems of protection and design of current limiting impedance in a protective coordination system, which are the limitations in the related art, in a manner of detecting fault current flowing to a current limiting impedance unit, measuring heat capacity of the current limiting impedance unit thereof, and accordingly limiting the fault current flowing to the current limiting impedance unit.

To achieve these and other advantages and in accordance with the purpose of this specification, as embodied and broadly described herein, there is provided fault current limiter (FCL) including a first switching unit configured to block an applied fault current and switch a flow path of the fault current, a current limiting impedance unit configured to limit the fault current, a second switching unit configured to switch over a flow path of the fault current connected to the current limiting impedance unit such that the fault current flowing toward the current limiting impedance unit can be limited, and a controller configured to detect the fault current, compare the detected result with a preset reference value, and control the second switching unit according to the comparison result.

In one exemplary embodiment disclosed herein, the fault current may be one of a ground fault current, a short-circuit current and an overload current.

In one exemplary embodiment disclosed herein, the first switching unit may allow the fault current to flow to the current limiting impedance unit when the fault current is applied.

In one exemplary embodiment disclosed herein, the first switching unit may include a superconductor configured to block the flow of the fault current in a manner that a resistance value thereof is increased by the fault current, and a contact switching portion configured to switch the flow path of the fault current toward the current limiting impedance unit, In one exemplary embodiment disclosed herein, the current limiting impedance unit may include at least one current limiting impedance element.

In one exemplary embodiment disclosed herein, the second switching unit may include a current flowing portion connected in parallel to the current limiting impedance unit, and an auxiliary impedance portion connected in series to the current limiting impedance unit.

In one exemplary embodiment disclosed herein, the current flowing portion may be a flow path to which the fault current is bypassed for flow. The current flowing portion may be configured as a switching element that is open in a normal condition and closed during an operation.

In one exemplary embodiment disclosed herein, the auxiliary impedance portion may include at least one auxiliary current limiting impedance element, and a changeover switch portion configured to switch over a connection between the current limiting impedance unit and each of the at least one auxiliary current limiting impedance element.

In one exemplary embodiment disclosed herein, the preset reference value may be a reference value set according to a maximum rated capacity of the current limiting impedance unit.

In one exemplary embodiment disclosed herein, the controller may include a CT configured to detect the fault current, so as to measure magnitude and duration of the fault current and heat capacity of the current limiting impedance unit.

In one exemplary embodiment disclosed herein, the controller may control the second switching unit to limit the fault current flowing to the current limiting impedance unit, when the measured result exceeds the preset reference value.

In one exemplary embodiment disclosed herein, the controller may control an operation of the second switching unit according to a degree that the detected result exceeds the preset reference value.

Fault current limiter (FCL) disclosed herein may prevent a current limiting impedance unit from being damaged due to fault current, by detecting the fault current flowing to the current limiting impedance unit, measuring heat capacity of the current limiting impedance unit, and limiting the fault current flowing to the current limiting impedance unit according to the heat capacity.

In the FCL disclosed herein, the prevention of the damage on the current limiting impedance unit due to the fault current by way of limiting the fault current flowing to the current limiting impedance unit may result in preventing expansion of an accident due to the damaged current limiting impedance unit.

In the FCL disclosed herein, the prevention of the expanded accident due to the damaged current limiting impedance unit by way of preventing the damage on the current limiting impedance unit due to the fault current may result in enabling stabilization of a system and line protection.

In the FCL disclosed herein, the prevention of the expanded accident due to the damaged current limiting impedance unit by way of preventing the damage on the current limiting impedance unit due to the fault current may result in facilitating protective coordination with other equipment.

The FCL disclosed herein may be allowed for application thereof according to capacity, by virtue of the configuration of detecting the fault current flowing to the current limiting impedance unit, measuring the heat capacity of the current limiting impedance unit, and limiting the fault current flowing to the current limiting impedance unit according to the heat capacity.

The FCL disclosed herein may have an expanded lifespan by virtue of the allowed application according to the capacity.

A FCL having an appropriate capacity can be easily designed by virtue of the allowed application of the FCL disclosed herein according to the capacity.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 7 is a flowchart illustrating sequential steps of operating fault current limiter disclosed herein.

DETAILED DESCRIPTION OF THE DISCLOSURE

Figure 1:
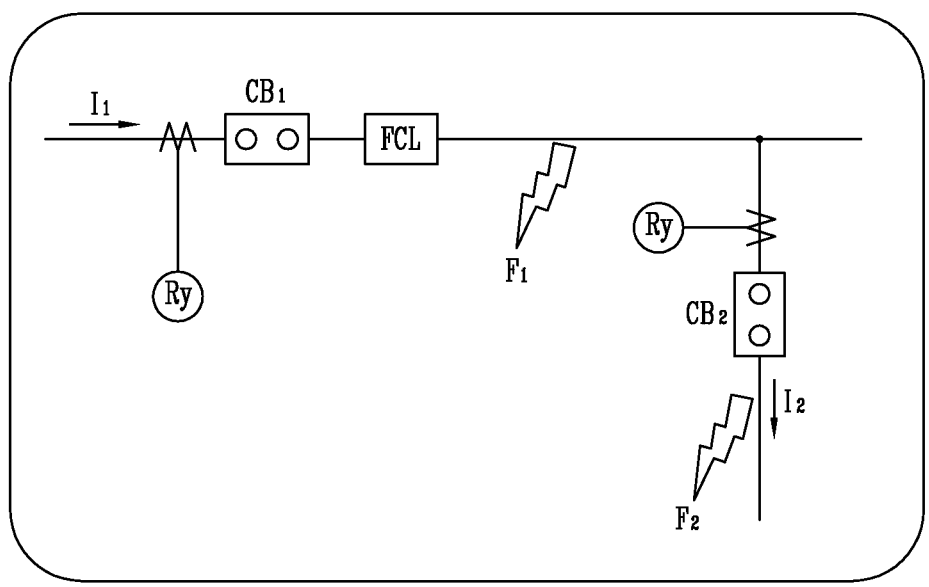
FIG. 1 is a single-line diagram illustrating a state of a system in which the related art fault current limiter operates.

The invention disclosed herein may be applied, but not limited, to fault current limiter (FCL) which limits fault current flowing on a circuit or line. The technology disclosed herein may also be applied to any type of protective equipment, such as the conventional switch, relay, surge absorber, electronic contactor and circuit breaker, to which the technical idea of the present invention can be applied, and to current limiter circuits included in the protective equipment. Specifically, the FCL may be usefully practiced by being applied to monitoring equipment and protective equipment for protecting circuits which require for protective coordination with systems and ambient protective equipment.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

Hereinafter, preferred embodiments of the present invention will be described in detail with reference to the accompanying drawings, and the same or similar elements are designated with the same numeral references regardless of the numerals in the drawings and their redundant description will be omitted.

In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

Hereinafter, description will be given of fault current limiter (FCL) disclosed herein, with reference to FIGS. 2 to 7.

Figure 2:
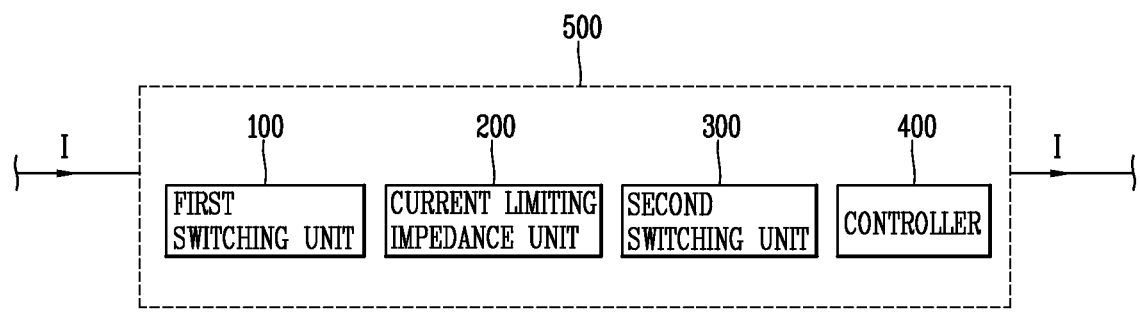
FIG. 2 is a block diagram illustrating a configuration of fault current limiter disclosed herein.

FIG. 2 is a block diagram illustrating a configuration of fault current limiter disclosed herein.

Figure 3:
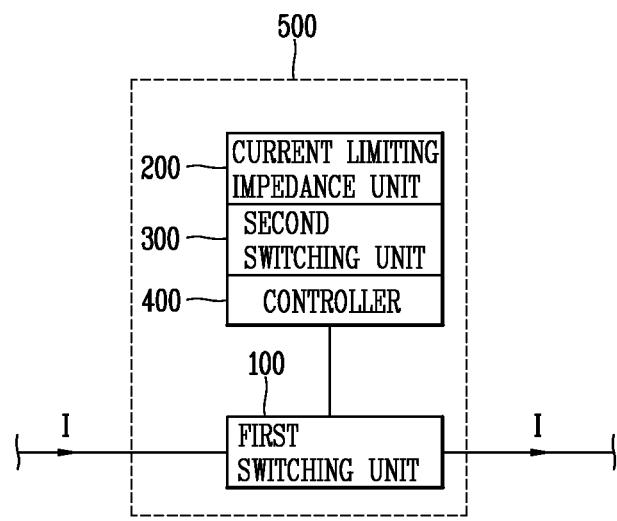
FIG. 3 is another block diagram illustrating the configuration of the fault current limiter disclosed herein.

FIG. 3 is another block diagram illustrating the configuration of the configuration of the fault current limiter disclosed herein.

Figure 4:
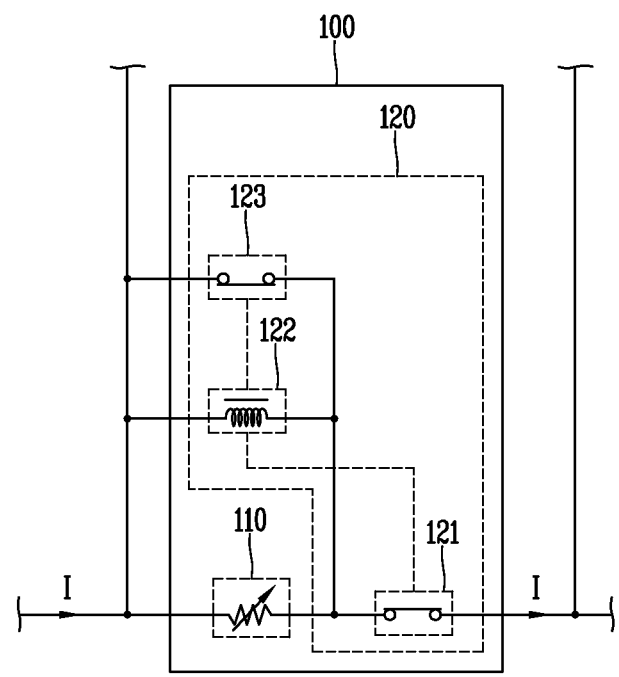
FIG. 4 is a circuit diagram illustrating a configuration in accordance with an embodiment of fault current limiter disclosed herein.

FIG. 4 is a circuit diagram illustrating a configuration in accordance with an embodiment of fault current limiter disclosed herein.

Figures 5, 6:
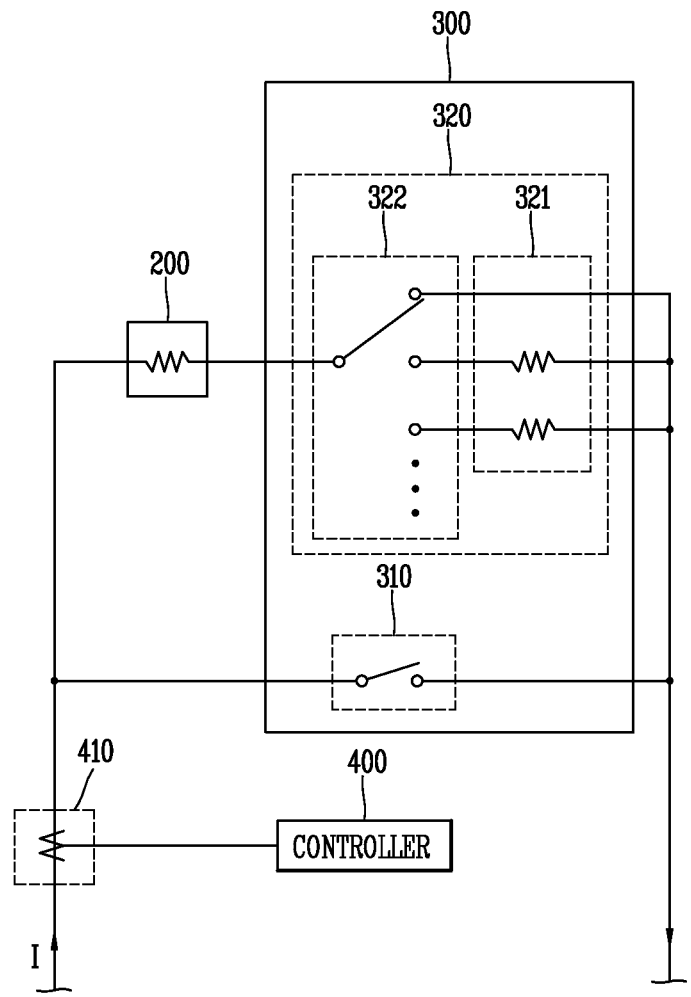
FIG. 5 is another circuit diagram illustrating the configuration in accordance with the embodiment of the fault current limiter disclosed herein.
FIG. 6 is an exemplary view illustrating a control setting in accordance with an embodiment of fault current limiter disclosed herein.

FIG. 5 is another circuit diagram illustrating the configuration in accordance with the embodiment of the fault current limiter disclosed herein.

FIG. 6 is an exemplary view illustrating a control setting in accordance with an embodiment of fault current limiter disclosed herein.

FIG. 7 is a flowchart illustrating sequential steps of operating fault current limiter disclosed herein.

As illustrated in FIG. 2, the fault current limiter (FCL) 500 includes a first switching unit 100 that blocks applied fault current and switches a flow path of the fault current, a current limiting impedance unit 200 that limits the fault current, a second switching unit 300 that switches a flow path of the fault current connected to the current limiting impedance unit 200 to limit the fault current flowing toward the current limiting impedance unit 200, and a controller 400 that detects the fault current, compares the detected result with a preset reference value, and controls the second switching unit 300 according to the comparison result.

The FCL 500 refers to protective equipment which limits fault current generated due to abnormal conditions, such as faults (accidents) occurred on a system and lines.

The FCL 500 may be protective equipment which performs a function of limiting a magnitude (amount, strength, etc.) and flow duration of the fault current.

The FCL 500 may protect the line from the fault current through protective coordination with other protective equipment, such as a circuit breaker which breaks the line, a switch, a relay and the like.

For example, the FCL 500 may be installed between a circuit breaker A performing a main protecting function and a circuit breaker B performing a sub protecting function. The FCL 500 may limit the fault current after the operation of the circuit breaker A performing the main protecting function and until before the operation of the circuit breaker B performing the sub protecting function, thereby enabling the protective coordination for preventing expansion of an accident.

The fault current may be a current which is generated due to an abnormal state, such as faults occurred on a system and a line.

That is, when the fault current has a magnitude (strength) over a rated value, it may be likely to cause breakdown of facilities, loads and the like connected to the system and the line.

The fault current may be one of a ground fault current, a short-circuit current and an overload current generated on the system and the line.

Hereinafter, description will be given of a configuration and an operation according to an embodiment of the first switching unit 100, with reference to FIGS. 3 to 5.

The circuit of the FCL 500, as illustrated in FIG. 3, may be configured by dividing into two parts.

The circuit configuration of the FCL 500 may be divided into two parts, namely, a part including the first switching unit 100 connected to an input terminal of the FCL 500, and another part including the current limiting impedance unit 200, the second switching unit 300 and the controller 400 which are connected to the first switching unit 100.

As one of the two circuit parts of the FCL 500, the first switching unit 100 may allow the fault current to flow to the current limiting impedance unit 200 when the fault current is applied.

The first switching unit 100, as illustrated in FIG. 4, may include a superconductor 110 whose resistance value is increased by the fault current so as to block the flow of the fault current, and a contact switching portion 120 that switches over the flow path of the fault current such that the fault current can flow toward the current limiting impedance unit 200.

The superconductor 110 may be a variable resistor which maintains a resistance value allowing for a flow of a current during a normal operating state and increases the resistance value when the fault current is applied.

For example, the superconductor 110 may maintain a resistance value of 10[Ω] such that a current can flow. However, when the fault current is applied, the superconductor 110 may recognize it and increase the resistance value up to 10 [KΩ] to make it difficult for the current to flow.

That is, when the fault current is applied, the resistance value of the superconductor 110 may increase, and accordingly the fault current can be blocked by the increased resistance value, without flowing along the existing flow path.

The contact switching portion 120 may perform a function of switching over the flow path of the fault current which has been bypassed due to the increased resistance value of the superconductor 110.

The contact switching portion 120 may include at least one switching element 121 and 123.

The contact switching portion 120 may additionally include a relaying element 122 that enables an operation of the at least one switching element 121 and 123.

The at least one switching element may be configured as one contact switching element of a contact a 121 or a contact b 123.

The contact a 121 refers to a contact which is closed in a normal condition and opened during an operation.

The contact b 123 refers to a contact which is opened in a normal condition and closed during an operation.

The relaying element 122 may be relayed when a current flows, so as to enable the operations of the contact a 121 and the contact b 123.

The contact switching portion 120 may be configured such that the relaying element 122 and the contact b 123 are connected in parallel, and the parallel-connected relaying element 122 and contact b 123 are connected to the contact a 121 in series.

That is, one end of the relaying element 122 may be connected to one end of the contact b 123 and the other end of the relaying element 122 may be connected to the other end of the contact b 123. Here, the other ends of the relaying element 122 and the contact b 123 may be connected to one end of the contact a 121.

When the relaying element 122 is relayed in response to a current applied thereto, the contact a 121 and the contact b 123 may operate such that the contact a 121 can be open and the contact b 123 can be closed.

Hereinafter, an example of the circuit configuration and the operation of the first switching unit 100 will be described, with reference to FIG. 4.

One end of the superconductor 110 may be connected to the input terminal of the FCL 500 such that a current applied to the FCL 500 can flow to the superconductor 110.

The other end of the superconductor 110 may be connected to one end of the contact a 121 included in the contact switching portion 120, such that the current flowed to the superconductor 110 can flow through the contact a 121 which is in a closed state.

The superconductor 110 may also be connected in parallel to the relaying element 122 and the contact b 123 included in the contact switching portion 120, such that the current bypassed by the superconductor 110 can flow to one of the relaying element 122 and the contact b 123.

That is, one end of the superconductor 110 may be connected to one end of each of the relaying element 122 and the contact b 123 and the other end of the superconductor 110 may be connected to the other end of each of the relaying element 122 and the contact b 123. Here, the other ends of the superconductor 110, the relaying element 122 and the contact b 123 may be connected to one end of the contact a 121.

An initial resistance value of the superconductor 110 may be smaller than a resistance value of the relaying element 122.

That is, the superconductor 110, the relaying element 122 and the contact b 123 may be connected in parallel to one another. Here, since the resistance value of the superconductor 110 is smaller than the resistance values of the relaying element 122 and the contact b 123, the current applied to the FCL 500 may flow toward the superconductor 110.

When the current is applied to the FCL 500, the current may be applied to the superconductor 110 which has the smallest resistance value among the superconductor 110, the relaying element 122 and the contact b 123, and then flow through the contact a 121 which is connected in series to the superconductor 110.

When the fault current is applied to the FCL 500, the resistance value of the superconductor 110 may be increased by the fault current. The increased resistance value of the superconductor 110 may bypass the fault current to flow toward the relaying element 122. In response to the flow of the fault current, the relaying element 122 may be relayed to operate the contact a 121 in a closed state and the contact b 123 in an open state. Accordingly, the contact a 121 may be open and the contact b 123 closed, thereby switching over the flow path of the fault current.

Once the flow of the fault current is blocked and the flow path of the fault current is switched over by the first switching unit 100, the fault current may be bypassed by the first switching unit 100 and thus flow toward the current limiting impedance unit 200.

Hereinafter, description will be given of configurations and operations of the current limiting impedance unit 200, the second switching unit 300 and the controller 40 according to an embodiment disclosed herein, with reference to FIG. 5.

As one part of the circuit configuration of the FCL 500, the current limiting impedance unit 200 may limit the magnitude and flow duration of the fault current when the fault current flows by bypassing the first switching unit 100.

The current limiting impedance unit 200 may include at least one current limiting impedance element.

That is, the current limiting impedance unit 200 may include a plurality of current limiting impedance elements.

The current limiting impedance element may be configured as a resistor having resistance.

The current limiting impedance element may be a resistor with high resistance, so as to limit the magnitude and duration of the fault current.

As one part of the circuit configuration of the FCL 500, the second switching unit 300 may switch over the flow path of the fault current applied toward the current limiting impedance unit 200, when the magnitude and duration of the fault current is more than rated values of the current limiting impedance unit 200, thereby limiting the fault current applied toward the current limiting impedance unit 200.

That is, the second switching unit 300 may switch the flow path of the fault current which flows toward the current limiting impedance unit 200, thereby performing a function of protecting the current limiting impedance unit 200 from the fault current.

The second switching unit 300 may include a current flowing portion 310 connected in parallel to the current limiting impedance unit 200, and an auxiliary impedance portion 320 connected in series to the current limiting impedance unit 200.

The current flowing portion 310 may be a flow path to which the fault current is bypassed so as to flow therealong. The current flowing portion 310 may be configured as a switching element which is opened in normal conditions and closed during an operation.

The current flowing portion 310 may be a flow path to which the fault current applied to the current limiting impedance unit 200 is bypassed by the current limiting impedance unit 200 for flow.

The current flowing portion 310 may be closed when the fault current applied to the current limiting impedance unit 200 is more than a rated value of the current limiting impedance unit 200, such that the fault current applied to the current limiting impedance unit 200 can flow toward the current flowing portion 310.

That is, when the fault current applied to the current limiting impedance unit 200 is more than the rated value of the current limiting impedance unit 200, the current flowing portion 310 may be closed such that the fault current applied to the current limiting impedance unit 200 can flow toward the current flowing portion 310. Accordingly, the current flowing portion 310 can serve as a substitute flow path for the current limiting impedance unit 200.

The auxiliary impedance portion 320 may include at least one auxiliary current limiting impedance element 321, and a changeover switch portion 322 that switches a connection between the current limiting impedance unit 200 and each of the at least one auxiliary current limiting impedance element 321.

The at least one auxiliary current limiting impedance element 321 may be connected as one node to at least one flow path without any element.

The at least one auxiliary current limiting impedance element 321 is an auxiliary element of the current limiting impedance unit 200, and may be configured to limit magnitude and duration of the fault current.

That is, the at least one auxiliary current limiting impedance element 321 may be connected in series to the current limiting impedance unit 200, so as to limit the magnitude and duration of the fault current along with the current limiting impedance unit 200.

That is, the at least one auxiliary current limiting impedance element 321 may perform a function of supplementing a limiting capability (resistance value) of the current limiting impedance unit 200, which limits the fault current, in a manner of adding its resistance value to the resistance value of the current limiting impedance unit 200.

The at least one auxiliary current limiting impedance element 321 may be configured as the same element as the current limiting impedance element included in the current limiting impedance unit 200.

The at least one auxiliary current limiting impedance element 321 may be a resistor having resistance.

The at least one auxiliary current limiting impedance element 321 may be configured as a resistor having high resistance, so as to limit the magnitude and duration of the fault current.

The changeover switch portion 322 may switch over the connection between the current limiting impedance unit 200 and the at least one auxiliary current limiting impedance element 321.

The changeover switch portion 322 may include at least two changeover switches.

The changeover switch portion 322 may allow the current limiting impedance unit 200 to be connected in series to one of the at least one flow path without any element and the at least one auxiliary current limiting impedance element 321.

An example illustrating the circuit configurations and operations of the current limiting impedance unit 200 and the second switching unit 300 will now be described with reference to FIG. 5.

One end of the current limiting impedance unit 200 may be connected as one node to an input terminal of the FCL 500 and one end of each of the superconductor 110, the relaying element 122 and the contact b 123, such that the fault current bypassed by the superconductor 110, the relaying element 122 and the contact b 123 can flow toward the current limiting impedance unit 200.

The one end of the current limiting impedance unit 200 may also be connected to one end of the current flowing portion 310 included in the second switching unit 300 such that the fault current flowing toward the current limiting impedance unit 200 can be bypassed toward the current flowing portion 310 and flow toward the current flowing portion 310.

The other end of the current limiting impedance unit 200 may be connected to one end of the changeover switch portion 322 included in the second switching unit 300. Accordingly, the other end of the current limiting impedance unit 200 may be connected to one of one end of the at least one flow path without any element and one end of the at least one auxiliary current limiting impedance element 321, by way of the switching of the changeover switch portion 322.

The other end of the at least one flow path without any element and the other end of the at least one auxiliary current limiting impedance element 321 may be connected as one node to the other end of the current flowing portion 310, so as to be connected to the first switching unit 100 or a flow path of an output terminal of the FCL 500.

When the fault current flows to the current limiting impedance unit 200 due to the flow path of the fault current being switched over, the fault current is limited by the current limiting impedance unit 200 with a high resistance value. Here, when the fault current is more than a rated value of the current limiting impedance unit 200, the current flowing portion 310 included in the second switching unit 300 is closed such that the fault current flowing to the current limiting impedance unit 200 can be bypassed to flow to the current flowing portion 310, or the current limiting impedance unit 200 and the auxiliary current limiting impedance element 321 may be serially connected by the changeover switch portion 322 of the auxiliary impedance portion 320 included in the second switching unit 300, and accordingly the resistance value of the current limiting impedance unit 200 and the resistance value of the auxiliary current limiting impedance element 321 may be added to each other so as to limit the fault current.

The flow path of the fault current which is connected to the current limiting impedance unit 200 can thusly be changed over by the second switching unit 300, thereby enabling the limit of the fault current and the protection of the current limiting impedance unit 200 from the fault current.

The controller 400 may be included in the front of the current limiting impedance unit 200.

The controller 400 may be located between the superconductor 100, the relaying element 122 and the contact b 123 and the current limiting impedance unit 200, to detect the fault current flowing to the current limiting impedance unit 200.

The controller 400 may detect the fault current flowing to the current limiting impedance unit 200, and compare the detected fault current with the preset reference value.

The preset reference value may be a reference value which is set based on a maximum rated capacity of the current limiting impedance unit 200.

That is, in order to prevent the current limiting impedance unit 200 from being damaged due to the fault current, the controller 400 may detect the fault current and compares the detected fault current with the reference value, which is set based on the rated value of the current limiting impedance unit 200, to thusly control the second switching unit 300 according to the comparison result, thereby protecting the current limiting impedance unit 200 from the fault current.

The controller 400 may include a CT 410 for detecting the fault current, thereby measuring the magnitude and duration of the fault current, and heat capacity of the current limiting impedance unit 200.

The CT 410 may refer to a device which detects a current flowing on a flow path.

The CT 410 may be located between the superconductor 100, the relaying element 122 and the contact b 123 and the current limiting impedance unit 200, so as to detect the fault current flowing to the current limiting impedance unit 200.

The heat capacity of the current limiting impedance unit 200 may refer to a quantity of power consumed by the current limiting impedance unit 200 due to the fault current.

The heat capacity may be measured by [Equation 1], as follows.

$$W = I^2 R t \; [\text{KWh}] \qquad \text{[Equation 1]}$$

where w denotes heat capacity of the current limiting impedance unit 200, I denotes magnitude of the fault current flowing to the current limiting impedance unit 200, R denotes a resistance value of the current limiting impedance unit 200, and t denotes duration of the fault current flowing to the current limiting impedance unit 200.

In case where the magnitude of the fault current for measuring the heat capacity, for example, flowing to the current limiting impedance unit 200, is 10 [A], the resistance value of the current limiting impedance unit 200 is 100 [KΩ], and the duration of the fault current flowing to the current limiting impedance unit 200 2 [s], the heat capacity may be 20000 [KWh] or 20 [MWh].

When the measured result exceeds the preset reference value, the controller 400 may control the second switching unit 300 to limit the fault current flowing to the current limiting impedance unit 200.

For example, when the measured result is 20000 [KWh] and the preset reference value as the rated value of the current limiting impedance unit 200 is 15000 [KWh], the measured result may exceed the preset reference value. Accordingly, the controller 400 may control the second switching unit 300 to limit the fault current flowing to the current limiting impedance unit 200.

When the measured result exceeds the preset reference value, the controller 400 may control one of the current flowing portion 310 and the auxiliary impedance portion 320 included in the second switching unit 300 to limit the fault current flowing to the current limiting impedance unit 200.

When controlling one of the current flowing portion 310 and the auxiliary impedance portion 320 included in the second switching unit 300, the controller 400 may perform the control according to priorities of the current flowing portion 310 and the auxiliary impedance portion 320.

That is, the controller 400 may preferentially control the current flowing portion 310 to be closed, such that the fault current flowing to the current limiting impedance unit 200 can be bypassed toward the current flowing portion 310. Afterwards, when the current flowing portion 310 malfunctions or it is difficult to fast close the current flowing portion 310, the controller 400 may control the auxiliary impedance portion 320 to limit the fault current flowing to the current limiting impedance unit 200.

The controller 400 may control the operation of the second switching unit 300 according to a degree that the measured result exceeds the preset reference value.

For example, degrees that the measured result exceeds the preset reference value may be divided into levels. Accordingly, an operating time of the second switching unit 300 may be controlled or one of the current flowing portion 310 and the auxiliary impedance portion 320 may be controlled according to a level to which the comparison result corresponds.

A detailed example will be described further with reference to FIG. 6. The operating time of the second switching unit 300 may be set to be reduced according to the degree that the measured result exceeds the preset reference value. Accordingly, the controller 400 may control the operating time of the second switching unit 300 to be reduced according to the level corresponding to the comparison result.

In the instance illustrated in FIG. 6, when the measured result is 20 [KWh] and the preset reference value is 10 [KWh], the measured result exceeds the preset reference value by 10 [KWh]. Accordingly, the controller 400 may control the operating time of the second switching unit 300 to be reduced by 0.01 [s] corresponding to the exceeded degree. Or, when the measured result is 50 [KWh] and the preset reference value is 20 [KWh], the measured result exceeds the prefer reference value by 30 [KWh]. Accordingly, the controller 400 may control the operating time of the second switching unit 300 to be reduced by 0.03 [s] corresponding to the exceeded degree.

As another example, one of the current flowing portion 310 and the auxiliary impedance portion 320 can be controlled according to the degree that the measured result exceeds the preset reference value. Thus, the controller 400 can control one of the current flowing portion 310 and the auxiliary impedance portion 320 according to a level to which the comparison result corresponds. When the degree that the measured result exceeds the preset reference value is low, the controller 400 may control the auxiliary impedance portion 320 to operate to limit the fault current. On the other hand, when the degree that the measured result exceeds the preset reference value is high, the controller 400 may control the current flowing portion 310 to operate so as for the fault current to be bypassed.

The aforementioned operating order of the FCL is illustrated in FIG. 7.

As illustrated in FIG. 7, the sequential steps of operating the FCL 500 may include applying fault current (S10), operating a first switching unit (S20), allowing the fault current to flow to a current limiting impedance unit (S30), measuring magnitude and duration of the fault current, and heat capacity of the current limiting impedance unit (S40), comparing the measured result with a preset reference value (S50), controlling a second switching unit according to the comparison result (S60), and limiting the fault current flowing to the current limiting impedance unit (S70).

In the step (S10) of applying the fault current, fault current which is generated due to a fault occurred on a system and a line may be applied to the FCL.

In the step (S20) of operating the first switching unit, the first switching unit may operate such that the fault current applied in the step (S10) of applying the fault current can be bypassed to the current limiting impedance unit for flow.

In the step (S30) of allowing the fault current to flow to the current limiting impedance unit, the fault current which has been bypassed by the operation of the first switching unit in the step (S20) of operating the first switching unit can flow to the current limiting impedance unit.

In the step (S30) of allowing the fault current to flow to the current limiting impedance unit, the magnitude and duration of the fault current may be limited by a current limiting impedance element included in the current limiting impedance unit.

In the step (S40) of measuring the magnitude and duration of the fault current and the heat capacity of the current limiting impedance unit, the magnitude and duration of the fault current, which has flowed in the step (S30) of allowing the fault current to flow to the current limiting impedance unit, may be detected, thereby measuring the heat capacity of the current limiting impedance unit according to the fault current on the basis of the detected result.

In the step (S50) of comparing the measured result with the preset reference value, the heat capacity of the current limiting impedance unit, which has been measured in the step (S40) of measuring the magnitude and duration of the fault current and the heat capacity of the current limiting impedance unit, may be compared with the preset reference value.

In the step (S50) of comparing the measured result with the preset reference value, the preset reference value may be a reference value set according to a maximum rated capacity of the current limiting impedance unit, and the heat capacity of the current limiting impedance unit may be a quantity of power consumed by the current limiting impedance unit due to the fault current.

In the step (S60) of controlling the second switching unit according to the comparison result, according to the comparison result between the measured result and the preset reference value in the step (S50) of comparing the measured result with the preset reference value, when the measured result exceeds the preset reference value, the second switching unit may be controlled to limit the fault current flowing to the current limiting impedance unit.

In the step (S60) of controlling the second switching unit according to the comparison result, the second switching unit can be controlled such that the fault current flowing to the current limiting impedance unit can be bypassed for flow, or the fault current flowing to the current limiting impedance unit can be limited by adding a resistance value of the current limiting impedance unit.

In the step (S70) of limiting the fault current flowing to the current limiting impedance unit, the second switching unit may be controlled in the step (S60) of controlling the second switching unit according to the comparison result, such that the fault current can be limited from flowing to the current limiting impedance unit. This may result in protecting the current limiting impedance unit from the fault current.

The embodiments of the FCL disclosed herein may be practiced by being applied to FCLs limiting fault current flowing on a line.

The embodiments of the FCL disclosed herein may be applied to switches, relays, surge absorbers, electronic contactors and circuit breakers.

The embodiments of the FCL disclosed herein may be applied to any type of line protective equipment and current limiting circuits included in the protective equipment.

The embodiments of the FCL disclosed herein may be applied to monitoring devices and protective equipment for protecting lines which require for protective coordination with systems and ambient protective equipment.

Fault current limiter (FCL) disclosed herein may prevent a current limiting impedance unit from being damaged due to fault current, by detecting the fault current flowing to the current limiting impedance unit, measuring heat capacity of the current limiting impedance unit, and limiting the fault current flowing to the current limiting impedance unit according to the heat capacity.

In the FCL disclosed herein, the prevention of the damage on the current limiting impedance unit due to the fault current by way of limiting the fault current flowing to the current limiting impedance unit may result in preventing expansion of an accident due to the damaged current limiting impedance unit.

In the FCL disclosed herein, the prevention of the expanded accident due to the damaged current limiting impedance unit by way of preventing the damage on the current limiting impedance unit due to the fault current may result in enabling stabilization of a system and line protection.

In the FCL disclosed herein, the prevention of the expanded accident due to the damaged current limiting impedance unit by way of preventing the damage on the current limiting impedance unit due to the fault current may result in facilitating protective coordination with other equipment.

The FCL disclosed herein may be allowed for application thereof according to capacity, by virtue of the configuration of detecting the fault current flowing to the current limiting impedance unit, measuring the heat capacity of the current limiting impedance unit, and limiting the fault current flowing to the current limiting impedance unit according to the heat capacity.

The FCL disclosed herein may have an expanded lifespan by virtue of the allowed application according to the capacity.

A FCL having an appropriate capacity can be easily designed by virtue of the allowed application of the FCL disclosed herein according to the capacity.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A fault current limiter (FCL) comprising:
    a first switching unit configured to block an applied fault current and switch a flow path of the fault current;
    a current limiting impedance unit configured to limit the fault current;
    a second switching unit configured to switch over a flow path of the fault current connected to the current limiting impedance unit such that the fault current flowing toward the current limiting impedance unit can be limited; and
    a controller configured to detect the fault current, compare the detected result with a preset reference value, and control the second switching unit according to the comparison result,
    wherein the second switching unit comprises:
    an auxiliary impedance portion connected in series to the current limiting impedance unit to form a series circuit, the auxiliary impedance portion comprising at least one auxiliary current limiting impedance element, and
    a current flowing portion connected in parallel to the series circuit,
    wherein the at least one auxiliary current limiting impedance element is configured to connect in series to the current limiting impedance unit to limit magnitude and duration of the fault current along with the current limiting impedance unit.

2. The fault current limiter of claim 1, wherein the first switching unit comprises:
    a superconductor configured to block the flow of the fault current in a manner that a resistance value thereof is increased by the fault current; and
    a contact switching portion configured to switch the flow path of the fault current toward the current limiting impedance unit,
    wherein the fault current flows to the current limiting impedance unit when the fault current is applied.

3. The fault current limiter of claim 1,
    wherein the at least one auxiliary current limiting impedance element corresponds to a current limiting impedance element included in the current limiting impedance unit.

4. The fault current limiter of claim 1, wherein the current flowing portion is a flow path to which the fault current is bypassed for flow, and
    wherein the current flowing portion is configured as a switching element that is open in a normal condition and closed during an operation.

5. The fault current limiter of claim 1, wherein the auxiliary impedance portion further comprises:
    a changeover switch portion configured to switch a connection between the current limiting impedance unit and each of the at least one auxiliary current limiting impedance element.

6. The fault current limiter of claim 1, wherein the preset reference value is a reference value set according to a maximum rated capacity of the current limiting impedance unit.

7. The fault current limiter of claim 1, wherein the controller is further configured to measure magnitude and duration of the fault current and heat capacity of the current limiting impedance unit.

8. The fault current limiter of claim 1, wherein the controller is further configured to control the second switching unit to limit the fault current flowing to the current limiting impedance unit when the detected result exceeds the preset reference value.

9. The fault current limiter of claim 8, wherein the controller is further configured to control an operation of the second switching unit according to a degree that the detected result exceeds the preset reference value.

* * * * *